(12) United States Patent
Fan et al.

(10) Patent No.: US 10,664,768 B2
(45) Date of Patent: May 26, 2020

(54) TRAVEL ADVISORY NOTIFICATIONS

(75) Inventors: Angus Yee-Jen Fan, Bellevue, WA (US); Bruce Alan Wynn, Lynnwood, WA (US)

(73) Assignee: Expedia, Inc., Bellevue, WA (US)

( * ) Notice: Subject to any disclaimer, the term of this patent is extended or adjusted under 35 U.S.C. 154(b) by 485 days.

(21) Appl. No.: 13/495,936

(22) Filed: Jun. 13, 2012

(65) Prior Publication Data
US 2013/0339341 A1    Dec. 19, 2013

(51) Int. Cl.
*G06F 17/30* (2006.01)
*G06Q 10/02* (2012.01)

(52) U.S. Cl.
CPC .................................. *G06Q 10/02* (2013.01)

(58) Field of Classification Search
CPC .. G06Q 10/02; G06Q 10/025; G06Q 30/0601; G06Q 30/02; G06Q 10/101; G06F 17/3087; G06F 17/3086
USPC ......................................................... 707/722
See application file for complete search history.

(56) References Cited

U.S. PATENT DOCUMENTS

| | | | | |
|---|---|---|---|---|
| 6,842,737 B1 * | 1/2005 | Stiles et al. | ........................ | 705/6 |
| 2005/0256751 A1 * | 11/2005 | O'Donnell | ........................ | 705/5 |
| 2006/0053055 A1 | 3/2006 | Baggett et al. | | |
| 2006/0277079 A1 | 12/2006 | Gilligan et al. | | |
| 2007/0143155 A1 * | 6/2007 | Whitsett et al. | .................. | 705/5 |
| 2008/0027921 A1 * | 1/2008 | Chandrasekar et al. | .......... | 707/4 |
| 2008/0091482 A1 | 4/2008 | Whitsett et al. | | |
| 2011/0071865 A1 * | 3/2011 | Leeds et al. | ....................... | 705/6 |
| 2013/0036139 A1 * | 2/2013 | Kung et al. | ................... | 707/780 |
| 2014/0304116 A1 * | 10/2014 | Chan et al. | ................ | 705/26.62 |

FOREIGN PATENT DOCUMENTS

WO    WO 2010/102325 A1    9/2010

* cited by examiner

*Primary Examiner* — Wei Y Zhen
*Assistant Examiner* — Mohammed N Huda
(74) *Attorney, Agent, or Firm* — Knobbe, Martens, Olson & Bear, LLP (57) ABSTRACT

A travel advisory generation system is provided that enables generation of travel advisories based upon one or more selected parameters (e.g., location, origin, destination, date, date range, travel provider, class of service, etc.). These travel advisories may be further incorporated into travel search results, providing relevant advisory information in conjunction, e.g., concurrently or in-line, with travel options. The advisories may be further customized in order to display desired notifications and not display undesired notifications to selected users of the travel advisory generation system (e.g., system operators, travel service providers (including, but not limited to, travel agents and travel managers of an organization), and travelers).

2 Claims, 8 Drawing Sheets

TRAVEL ADVISORY MESSAGE ADMINISTRATION (SEA/PDX)

FILE  EDIT  VIEW  FAVORITES  TOOLS  HELP

BACK  FORWARD  STOP  REFRESH  HOME  SEARCH  FAVORITES  HISTORY  MAIL  SIZE  PRINT

LINKS »  ADDRESS  HTTP://WWW.ABC.COM/MESSAGE ADVISORY CONFIG.HTML  GO

TRAVEL ADVISORY MESSAGE ADMINISTRATION    504 — NEW    EDIT    SEARCH    SUBMIT

| AGENT ONLY | AIRLINE | EVENT START | EVENT END | MSG START | MSG END | ORIG | DEST | MESSAGE | DEL |
|---|---|---|---|---|---|---|---|---|---|
| ☐ | AIRLINE 1 | | | | | SEA | | POSSIBLE STRIKE IN SEA | ☐ |
| ☑ | AIRLINE 2 FLIGHT ABC | MM/DD/YY | MM/DD/YY | MM/DD/YY | MM/DD/YY | | | SCHEDULED SYSTEM MAINTENANCE | ☐ |
| | | | | | | | | SCHEDULED QUALITY ASSURANCE CHECK -- DELAYS POSSIBLE-- | |
| ☐ | AIRLINE 3 | MM/DD/YY | MM/DD/YY | MM/DD/YY | MM/DD/YY | SEA | SEA | US PRESIDENT VISITS SEA ....(more) | ☐ |
| ☐ | AIRLINE 3 | | | MM/DD/YY | MM/DD/YY | SEA | SEA | ROUTE CANCELLATION | ☐ |

TRAVEL ADVISORY NOTIFICATIONS

BACKGROUND

A variety of events and conditions may surprise and/or disrupt a traveler during a planned trip. Examples may include labor strikes, mechanical failure, new fees/rules for travel, severe weather, security threats, high travel volume, and the like. Without advanced warning, these types of events and conditions may catch a traveler unaware, adding time and/or cost to the traveler's journey, as well as diminishing the traveler's enjoyment of his or her travel experience.

Accordingly, it is desirable for a traveler to obtain advance warning of disruptive events and conditions and make further or modify travel arrangements to mitigate and/or avoid travel disruptions. While attempts have been made to develop mechanisms for providing travelers of disruptions, their use and utility is relatively low.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where.

DETAILED DESCRIPTION

Generally described, aspects of the present disclosure pertain to generating travel advisories for display concurrently with travel item search results. More specifically, a travel advisory generation system is provided that enables generation of electronic travel notifications (also referred to herein interchangeably as travel advisories, travel alerts, and travel notices) based upon one or more selected parameters (e.g., origin, destination, travel dates, travel provider, etc.). These travel advisories may be further incorporated into travel item search results generated in response to a search query, providing relevant advisory information in conjunction with travel item options. From these travel item search results, users of the travel advisory generation system may further book one or more of the travel items identified in the travel item search results. As discussed in greater detail below, providing travel advisories in this manner may be extremely valuable for users of the travel advisory generation service, such as travelers who make their own travel arrangements as well as travel service providers who make travel arrangements on behalf of travelers (e.g., travel agents, travel managers of an organization, etc.). As discussed herein, users of the travel advisory system may include individual travelers, travel service providers, and operators of the travel advisory system.

Travel advisories may include any information that pertains to purchase of travel items, as well as information pertaining to the process of traveling, and may be issued by a variety of different entities. For example, travel advisories may be issued by government offices at any level, travel operators, transit hubs (e.g., airports, bus/rail terminals, ports, etc.), and the like regarding purchase of travel inventory (e.g., waiver of customary fees, restrictions, etc.) and/or in response to anticipated and/or currently experienced deviations from schedule (e.g., scheduled delays, possible labor strikes, national holidays, natural disasters, etc.).

While electronic travel notifications, including but limited to travel alerts, may be available to travelers and travel agents, these notifications may not always be received in time to enable a traveler or travel service provider to make alternative travel arrangements. Electronic travel notifications are obtained by travel service providers or travelers in a manner which is separate, logically, physically and temporally, from computer reservation systems used to search, track and reserve travel item inventory (e.g., the SABRE computer reservation system, etc.), as well as the computing devices employed by travel agents and travelers for booking travel items. For example, after booking a flight with an airline on behalf of a traveler using a computer reservation system, a travel agent may receive an e-mail message from the airline notifying the travel agent of a travel advisory (e.g., a strike impacting the airport at the flight's destination) or including a link to a network-based resource (e.g., a website) that provides the travel advisory information. The travel agent may then contact the traveler with the travel advisory information.

However, given the large volume and specific nature of travel notifications, and the tendency for travel service providers to conduct business in real-time with travelers, either by phone or in-person, it is impractical for a travel service provider to manually correlate all relevant travel notifications to a given traveler's travel itinerary, in real time. For example, most travel notifications are highly specific, concerning one or more of city, transit hub (e.g., airport, port, hotel, bus/rail terminal, travel operator, date, etc.). To make the relevant correlations with a traveler itinerary, with acceptable accuracy, would require more time by a travel service provider than desirable in a real-time business transaction. Furthermore, the volume of travel notifications and relevant applicability thereof makes the number of possible combinations of relevant notifications too high to practically identify prior to knowledge of the specific traveler itinerary. Similar observations are also relevant for travelers who attempt to book their own travel.

As discussed in greater detail below, embodiments of the travel advisory generation system may provide user interfaces which enable rapid, electronic identification of travel advisories relevant to specific travel parameters and customization of travel advisories to display different travel advisory information to different parties (e.g., travel service providers (including but not limited to travel agents), individual travelers, travelers traveling on behalf of organizations, etc.). The travel advisory generation system may further obtain search results for travel item inventory available for purchase from a network-based travel service that are relevant to selected travel parameters. The travel item search results and customized travel advisories may be further displayed concurrently (e.g., in-line with the travel item search results) to a user of the travel advisory generation system (e.g., a travel service provider or a traveler), allowing informed booking and/or re-booking decisions to be made for a travel itinerary satisfying the selected travel parameters. Beneficially, in this manner, the travel advisory generation system may enable real-time or near real-time integration of travel inventory search results and corresponding travel advisories.

For example, a travel agent may communicate with a traveler regarding booking of a desired flight between Seattle, Wash. and Portland, Oreg. on a specific airline and date (i.e., the travel parameters). The travel agent may communicate with the travel advisory generation system to provide these travel parameters. The travel advisory generation system may communicate with a network-based travel service to obtain a list of scheduled flights between Seattle and Portland, availability, and pricing. The travel advisory generation system may further communicate with a network-based travel notification resource that maintains electronic records of travel advisory information and the specific travel items, locations, dates, etc. to which the advisories pertain. By correlating the travel item search results with the travel advisory information maintained by the travel notification resource, the travel advisory generation system may obtain travel notifications relevant to the travel item search results.

The travel advisory generation system may further generate user interfaces for display of the travel advisory information concurrently with the travel item search results corresponding to the submitted travel parameters. In one embodiment, travel advisories may be displayed in-line in a user interface summarizing at least a portion of the travel item search results. In another embodiment, travel advisories may be displayed with detailed travel item information once a specific travel item search result is selected for review. The travel advisory so displayed may be a short summary that is expandable upon selection (e.g., double click, hover, etc.) to display a more thorough description. Those skilled in the art will appreciate that the travel advisory information may be displayed in more or less detail without departing from the scope of the present disclosure.

The travel advisory generation system may further generate user interfaces allowing a user of the travel advisory generation system to input display rules that configure the display of travel notifications concurrently with the travel item search results. In one embodiment, these configuration user interfaces may allow for search and display of notifications satisfying one or more travel parameters. For example, in the case where the travel inventory of interest is airline flights, the user interfaces may enable search and display of notifications pertaining to specific airport, airlines, scheduled flights, travel dates, event dates, and combinations thereof, inter alia.

Moreover, the display rules may further provide for changing travel advisories displayed in the user interface depending upon the user who views the user interface (e.g., system operators, travel service providers or travelers). It may be understood that, since travel advisories may be issued by a variety of different entities for a variety of topics, not every travel advisory for a travel item search result will be relevant to all users. For example, in the case of a system operator, some or all of the advisories may be displayed for use in further testing, configuration, etc. of the travel advisory generation system. In the case of a travel agent desiring to book a flight for travel of a client traveler, or a travel manager desiring to book a flight for travel of a traveler from their organization, it may be beneficial for the travel agent or travel manager to view advisory notifications which include industry specific information (e.g., fare rules, codes, etc.) which highlight restrictions and limitations in order to identify relevant options and to minimize the cost of their traveler's travel. However, in the case of the traveler desiring to book a flight for themselves, such notifications may be irrelevant and further may distract the traveler from other, more pertinent advisory notifications. Accordingly, a travel advisory notice may be configured for display to a travel agent or travel manager with a relevant search result, but not to a traveler when viewing the same search result.

In further embodiments, the travel advisory generation system may be used to generate custom travel notifications. The custom travel notifications may also be generated for any type of user of the travel advisory generation system (e.g., travelers, travel service providers, etc.) according to their specific needs. Furthermore, custom notifications may be generated by editing existing, default notification language or creating an entirely new notification. For example, in one embodiment, a travel manager may edit default language to be used when generating a specific notification for travelers from their organization and specify that custom language be displayed for that notification when organization travelers communicate with the travel advisory generation system to view travel item search results. In another embodiment, a travel agent may use the configuration user interfaces of the travel advisory generation system to specify that they receive notifications pertinent to travel policies of different corporate clients (e.g., preferred/non-preferred airlines, airports, fare classes, etc.). In a further embodiment, an individual may use the configuration user interfaces to generate a custom notification as a reminder. For example, a frequent traveler may create a new, custom notification to avoid travel on selected days.

Figure 1:
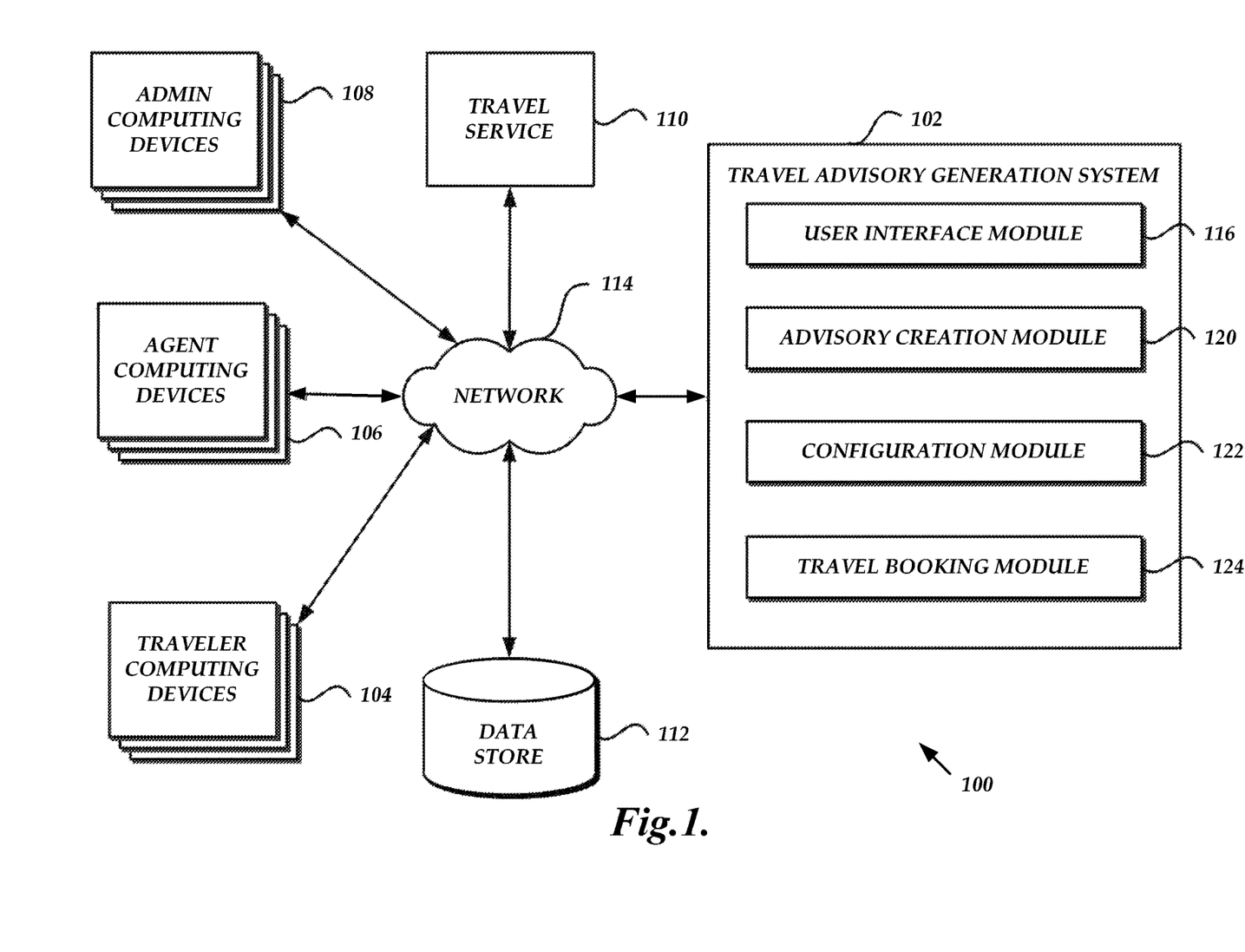
FIG. 1 is a block diagram depicting an operating environment for an illustrative travel advisory generation system used by travel consultants and travelers to make or modify travel arrangements.

With reference to FIG. 1, a block diagram depicting an illustrative operating environment 100 is shown which includes a travel advisory generation system 102 that enables automatic integration of travel advisory information into travel inventory search results based upon display configuration rules. The operating environment 100 further includes a network-based travel service 110 in communication with the travel advisory generation system 102 for use in providing travel inventory and making travel reservations on request of the travel advisory generation system 102. The operating environment 100 additionally includes one or more computing devices (e.g., 104, 106, 108) in communication with the travel advisory generation system 102 via a network 114. The computing devices may be operated by travelers (e.g., traveler computing devices 104), travel agents (e.g., agent computing devices 106), operators of the travel advisory generation system 102 (e.g., administrator computing devices 108), and the like. The operating environment 100 may further include one or more data storage devices (e.g., data store 112) in communication with the network 114.

The computing devices 104, 106, 108 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like. In other embodiments, the traveler computing devices 104, the travel agent computing devices 106, and administrator computing devices 108, are embodied in a plurality of devices, each executing an instance of the respective service or device. Such devices may include a network interface, memory, processing unit, and non-transitory computer-readable medium drive, all of which may communicate with each other by way of a communication bus. Moreover, a processing unit may itself be referred to as a computing device. The network interface may provide connectivity over the network 114 and/or other networks or computer systems. The processing unit may communicate to and from memory containing program instructions that the processing unit executes in order to operate the device. The memory generally includes RAM, ROM, and/or other persistent and/or auxiliary non-transitory computer-readable storage media.

Those skilled in the art will appreciate that the network 114 may be any wired network, wireless network, or combination thereof. In addition, the network 114 may be a personal area network, local area network, wide area network, cable network, satellite network, cellular telephone network, or combination thereof. In the illustrated embodiment, the network 114 is the Internet. Protocols and components for communicating via the Internet or any of the other aforementioned types of communication networks are well known to those skilled in the art of computer communications and thus, need not be described in more detail herein.

The travel advisory generation system 102 and/or the travel service 110 may include an arrangement of computer hardware and software components used to implement aspects of the present disclosure. For example, the travel advisory generation system 102 may be a server that includes a network interface, a processing unit, an input/output device interface, a display, an input device, and a computer readable medium drive, all of which may communicate with one another by way of a communication bus. The network interface may provide connectivity to one or more networks or computing systems. The processing unit may thus receive information and instructions from other computing systems or services via a network, such as network 114. The processing unit also communicates to and from memory and further provides output information for the display via the input/output device interface. The input/output device interface may also accept input from an input device, such as a keyboard, mouse, digital pen, touch screen, etc.

The memory may contain computer program instructions that the processing unit of the travel advisory generation system 102 executes in order to implement one or more embodiments. The memory generally includes RAM, ROM and/or other persistent, non-transitory computer-readable media. The memory may store an operating system that provides computer program instructions for use by the processing unit in the general administration and operation of the travel advisory generation system 102. The memory may further include computer program instructions and other information for implementing aspects of the present disclosure. For example, the memory may include any one or more of a user interface module 116, an advisory creation module 120, a configuration module 122, and a travel booking module 124, each of which will be described in more detail below.

In other embodiments, the travel advisory generation system 102 and/or the travel service 110 are implemented in a distributed computing environment comprising several computer systems that are interconnected using one or more networks. In yet other embodiments, the travel advisory generation system 102 may itself include or implement the travel service 110. In addition, the travel advisory generation system 102 and/or travel service 110 could include various Web services and/or peer-to-peer network configurations. In yet other embodiments, the travel advisory generation system 102 and/or the travel service 110 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. Thus, the depiction of the operating environment 100 in FIG. 1 should be taken as illustrative and not limiting to the present disclosure.

The data store 112 may include any data storage device understood in the art, including magnetic, optical, and solid-state data storage devices, hard disk drives, and/or any other type of non-transitory computer-readable storage medium accessible to the travel advisory generation system 102. The data store 112 may be further embodied in one or more data storage devices. These data storage devices may be accessible over the network 114 and/or may be local to one or more of the travel advisory generation system 102, the network-based travel service 110, and the computing devices 104, 106, 108. In addition, the data store 112 may also be distributed or partitioned across multiple storage devices as is known in the art without departing from the scope of the present disclosure.

The data store 112 may represent multiple network-accessible data storage devices that independently maintain data for the travel advisory generation system 102, the travel service 110, and advisory notices. For example, the data store 112 may maintain fare, schedule, and rule information for travel inventory maintained by the travel service 110 (e.g., for purchase and booking). In another example, the data store 112 may maintain a record of past searches for travel inventory maintained by the travel service 100 (e.g., a cache). The data store 112 may maintain one or more issued travel advisory notices. For example, issued travel advisory notices may be maintained by a data store 112 associated with the travel service 110. Alternatively, the travel advisory notices may be maintained by a data store 112 associated with another network-based resource such as a website. In other embodiments, issued travel advisory notices may be maintained by a plurality of data stores associated with different entities. In a further example, the data store 112 may maintain display rules that may be employed by the travel advisory generation system 102 to configure which the display of integrated travel search results and advisory notifications. In an additional example, the data store 112 may maintain one or more user interfaces (or instructions to generate such user interfaces) for the travel advisory generation system 102.

Figure 2A:
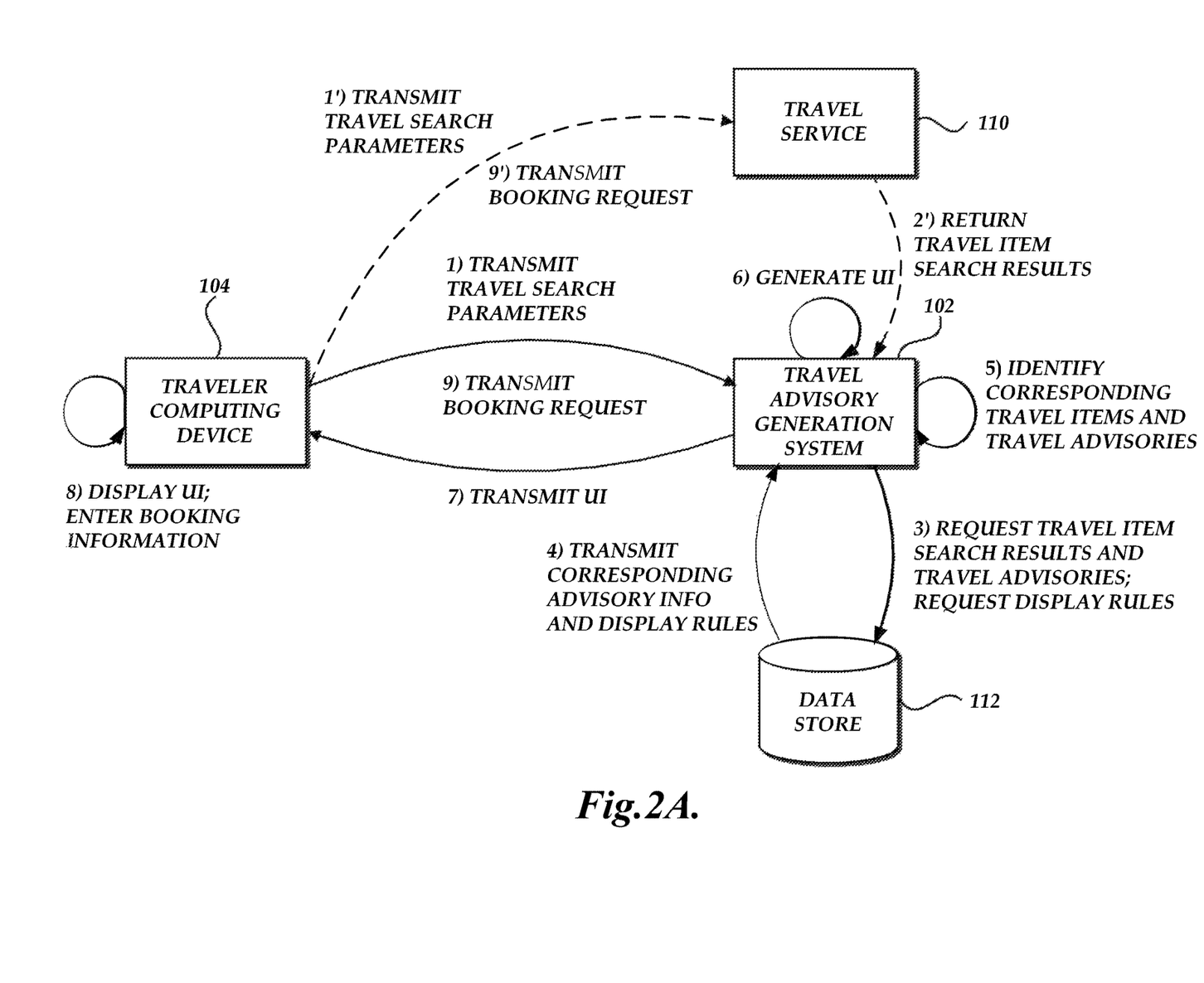
FIG. 2A is a block diagram depicting generation of user interfaces by the travel advisory generation system of FIG. 1, the user interfaces incorporating travel advisory information corresponding to travel item search results.

FIG. 2A is a block diagram depicting generation of user interfaces by the travel advisory generation system 102 of FIG. 1. As well be described in more detail below, the user interfaces may display travel advisory information concurrently (e.g., in-line) with a corresponding travel item from the search results. Assume use of the travel advisory generation system 102 by a traveler. The traveler, using his or her own traveler computing device 104, may communicate with either the travel advisory generation system 102 and/or travel service 110 to request search results for travel items of interest. For example, the traveler may submit the request by entering one or more travel parameters in a search user interface received from the travel service 110 or travel advisory generation system 102 in order to identify travel inventory corresponding to the travel parameters. In one embodiment, the traveler may submit the travel parameters to the travel service 110 (1'), which generates relevant search results and transmits the search results to the travel advisory generation system 102 (2').

Figure 3A:
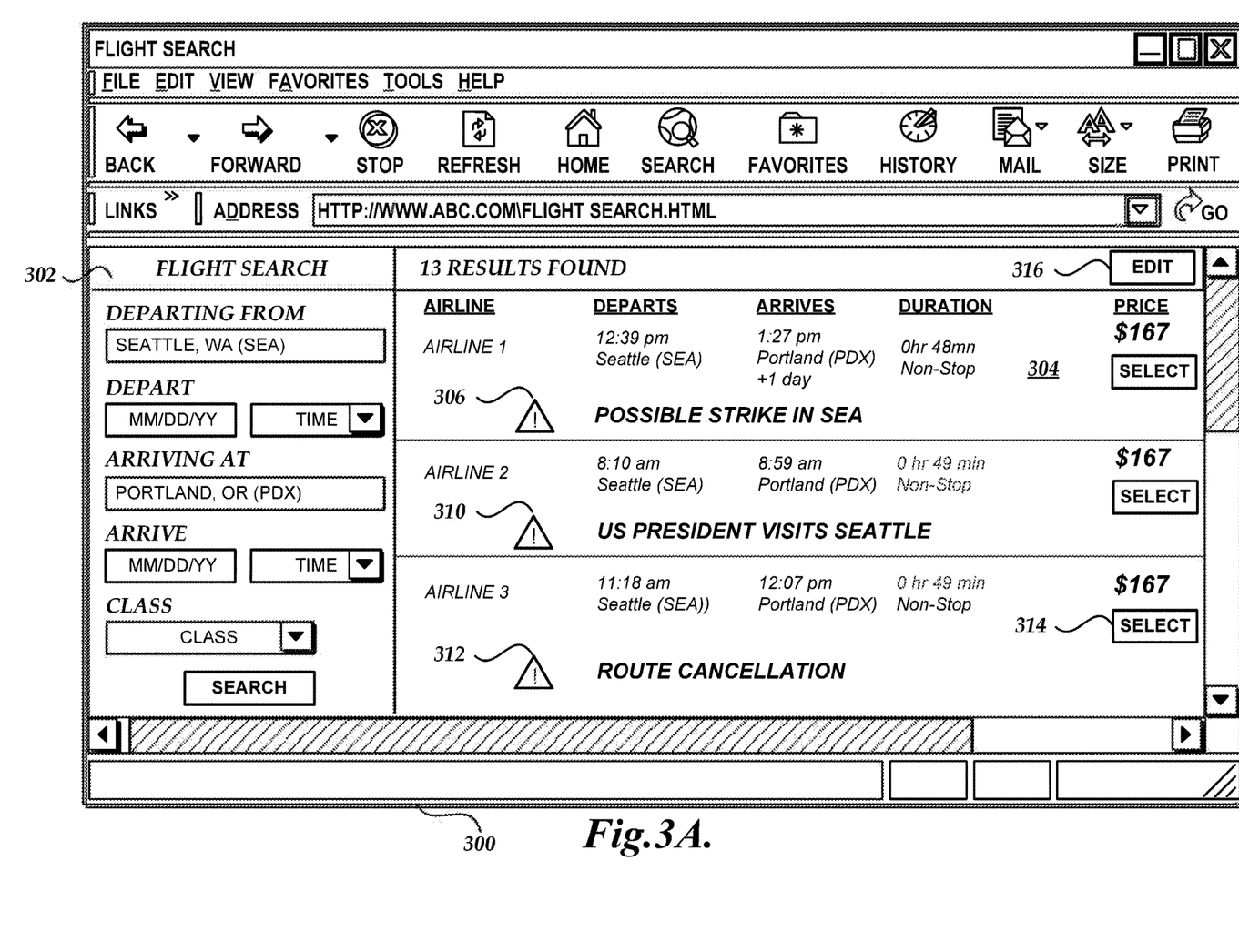
FIGS. 3A-3B are pictorial diagrams of illustrative user interfaces for displaying travel advisory information in-line or concurrently with travel item search results.

Alternatively, the travel advisory generation system 102 may include the functionality of the travel service 110 in one or more modules. Thus, the traveler may instead transmit the travel parameters directly to the travel advisory generation system (1). For example, with reference to FIG. 3A, an embodiment of a search user interface 300 generated and provided to the traveler computing device 104 by the user interface module 116 is illustrated. The user interface 300 includes a search window 302 that allows the traveler to select or input a plurality of travel item search parameters. The travel parameters may be any information related to travel and may include, but are not limited to, one or more of a location of departure and/or arrival (e.g., city, airport, rail terminal, bus terminal, port, etc.), a travel item provider (e.g., airline, rail, bus, cruise line, hotel, entertainment venue, excursion operator, etc.), a departure, and/or return date and/or time, a fare class (e.g., first class, second class, coach, etc.). For example, as illustrated in FIG. 3A, a search is performed for flights departing from Seattle Sea-Tac Airport (SEA) and arriving in Portland International Airport (PDX) which returns 13 results. In further embodiments, the travel advisory generation system 102 may obtain cached travel item search results from the data store 112 that were previously generated in response to a travel item search request using the travel parameters.

Figure 2B:
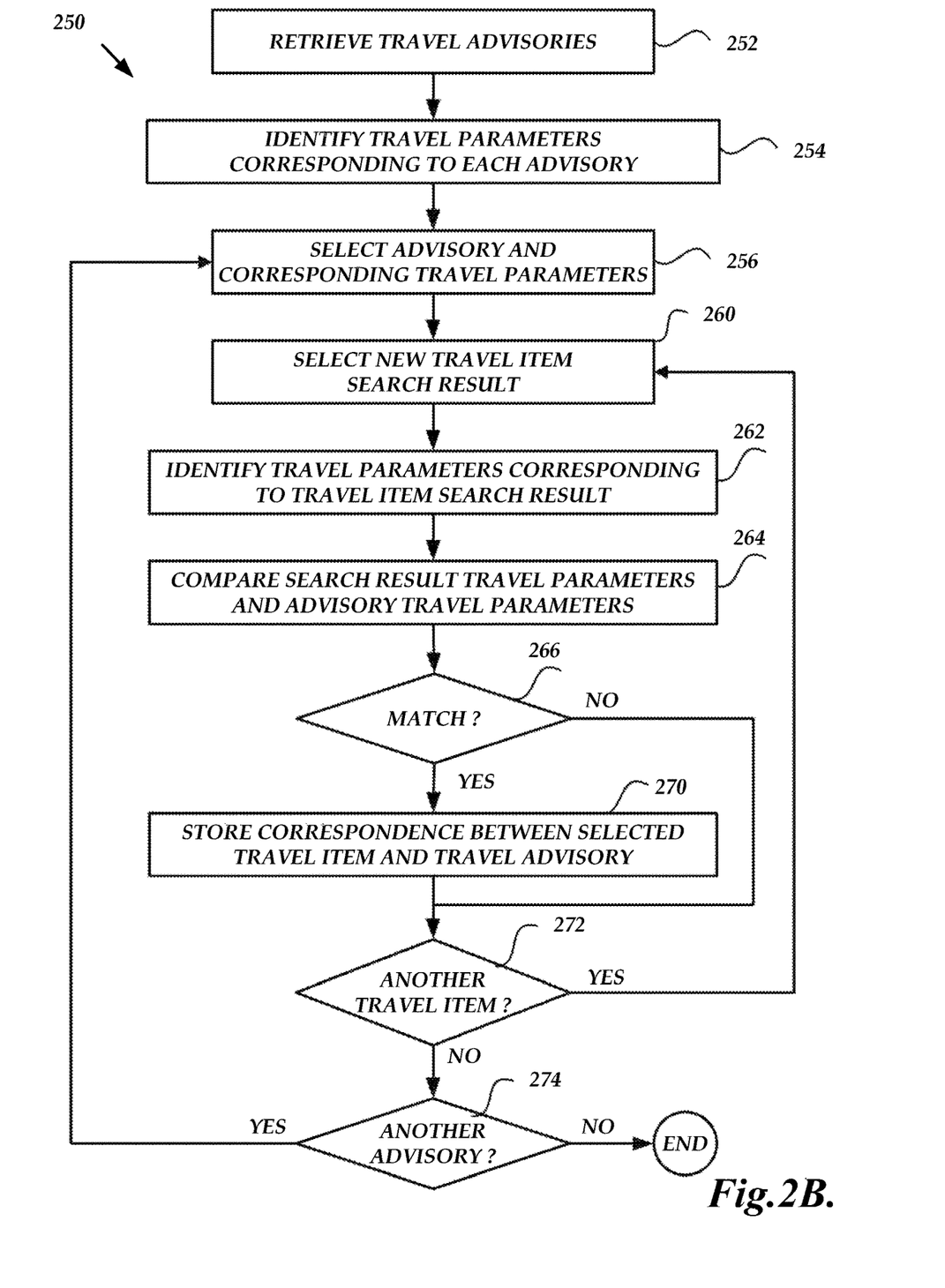
FIG. 2B is a flow diagram depicting an illustrative process for identifying travel advisories corresponding to one or more travel item search results.

The search results may be further analyzed by the travel advisory generation system 102 to identify travel advisories that match (also interchangeably referred to as corresponding herein) to the travel items returned in the search results. FIG. 2B is a flow diagram depicting an illustrative process 250 implemented by the travel advisory generation system 102 for identifying travel advisories corresponding to one or more travel item search results. In block 252, travel advisories are retrieved by the advisory creation module 120 from the data store 112 (3), which may maintain a data store (e.g., a database) of travel advisory information and travel parameters relevant to the travel advisory information. In block 254, the travel parameters corresponding to each notification are identified (e.g., the conditions pertaining to the advisory, such as travel provider, start date, end date, location and/or transit hub, etc.). In block 256, one of the travel advisories and its corresponding travel parameters are selected. In block 260 the advisory creation module 120 may select one of the travel item search results from the data store 112 (3). The travel parameters corresponding to the travel item are identified in block 262. In one embodiment, when the travel item search results are received from the travel service 110, or the advisory creation module 120 may identify relevant travel parameters from the travel item search results in a manner similar to that discussed above for the travel advisory notifications. Alternatively, when the travel item search is performed by the travel advisory generation system 102 in response to receipt of travel parameters directly from the user (e.g., the traveler in the example of FIG. 2A), these received travel parameters may be used instead.

The advisory creation module 120 may further compare the travel parameters of the selected travel item search result and the travel parameters for a selected travel advisory in block 264 to determine if the selected travel advisory corresponds to the selected travel item search result. For example, in certain embodiments, travel parameter matches may be identified when a travel parameter of a travel item search result and a travel parameter of a travel advisory are the same. Alternatively, a match may be identified when respective travel parameters of a travel item search result and a travel advisory are similar but not exact matches. For example, when the respective travel parameters of a travel item search result and a travel advisory differ from one another by less than a selected amount, the travel item search result and travel advisory are determined to correspond to one another. In the case where the travel parameter being compared is a location parameter, the selected amount may be a distance (e.g., 25 miles). Thus, a travel advisory which is pertinent to an area less than about 25 miles from an airport would be correlated with flights arriving or departing from the airport.

At decision block 266, it is determined whether a match is identified between the travel parameters of the selected travel item search result and the travel advisory parameters of the selected travel advisory. If so, the correspondence between the selected travel item search result and the selected travel advisory is stored (e.g., in data store 112) in block 270. If there is no match, or if there is a match and the correspondence or match is stored, it is determined in decision block 272 whether there is another travel item search result to be processed. If so, blocks 260-270 are repeated for each obtained travel item search result. Once the last travel item search result is processed, it is determined in decision block 274 whether there is another travel advisory to be processed. If so, blocks 256-274 are repeated until the last travel advisory is processed.

Upon identifying one or more travel advisories corresponding to a travel item search result, the user interface module 116 implemented by the travel advisory generation system 102 may generate instructions for rendering a user interface for display of the travel item search result and its corresponding travel advisories on a computing device (6) and transmit the instructions to the traveler computing device 104 (7) for display (8). For example, with continued reference to FIG. 3A, three travel item search results are illustrated in a travel item search results window 304 for flights between Seattle (SEA) and Portland (PDX) operated by Airlines 1, 2, and 3. Each result lists the airline, departure and arrival city, date and time of departure and arrival, travel duration, price, and a user interface object 314 allowing selection of the respective flight for display of further details and, optionally, purchase (e.g., by use of the travel booking module 124). The travel item search results may also include one or more travel advisories, e.g., 306, 310, 312, corresponding to the respective flights.

Returning to FIG. 2A, the traveler, using his or her traveler computing device 104, may further use the displayed user interface to book one or more of the displayed travel item search results. For example, the traveler may request booking of a desired travel item search result by, for example, selecting the desired travel item search result (e.g., user interface object 314), entering personal information, providing payment, and confirming submission of the booking request. Upon confirming submission of the booking request, the information entered in the user interface may be transmitted to either the travel service 110 (9') or the advisory generation system 102 (9) when the functionality of the travel service 110 is incorporated into the travel advisory generation system 102. Upon receipt of the booking request, the travel service 110 or advisory generation system 102 (e.g., the travel booking module 124) may book the desired travel item and debit the traveler's purchase account.

Travel advisories corresponding to each travel item search result may be displayed by a computing device (e.g., 104, 106, 108). As discussed in greater detail below, a user of the travel advisory generation system 102 (e.g., a system operator, a travel service provider, a traveler, etc.) may further customize the travel advisories. For example, a system operator may select travel advisories which are displayed to any of travel agents, travel managers and travelers. In another embodiment, travel service providers (e.g., travel agents and/or travel managers) may select which travel advisories that they view. In a further embodiment, travel managers may select which travel advisories that travelers within their organization view.

A travel advisory may be represented in the user interface 300 by symbols, text, images, icons, etc., or combinations thereof. In one embodiment, a symbol may be configured to signal, alert or draw attention and may include bold colors, large size, exclamation points, etc. The text displayed on the summary of travel item search results, in one embodiment, may be a short summary or excerpt of the travel advisory. For example, the travel advisories 306, 310, 312 listed in FIG. 3A are "Possible Strike In SEA," "US President Visits Seattle," and "Route Cancellation," respectively. While these travel advisories are presented as examples, it may be understood that other travel advisories may be presented, without limiting the scope of the present disclosure.

Figure 3B:
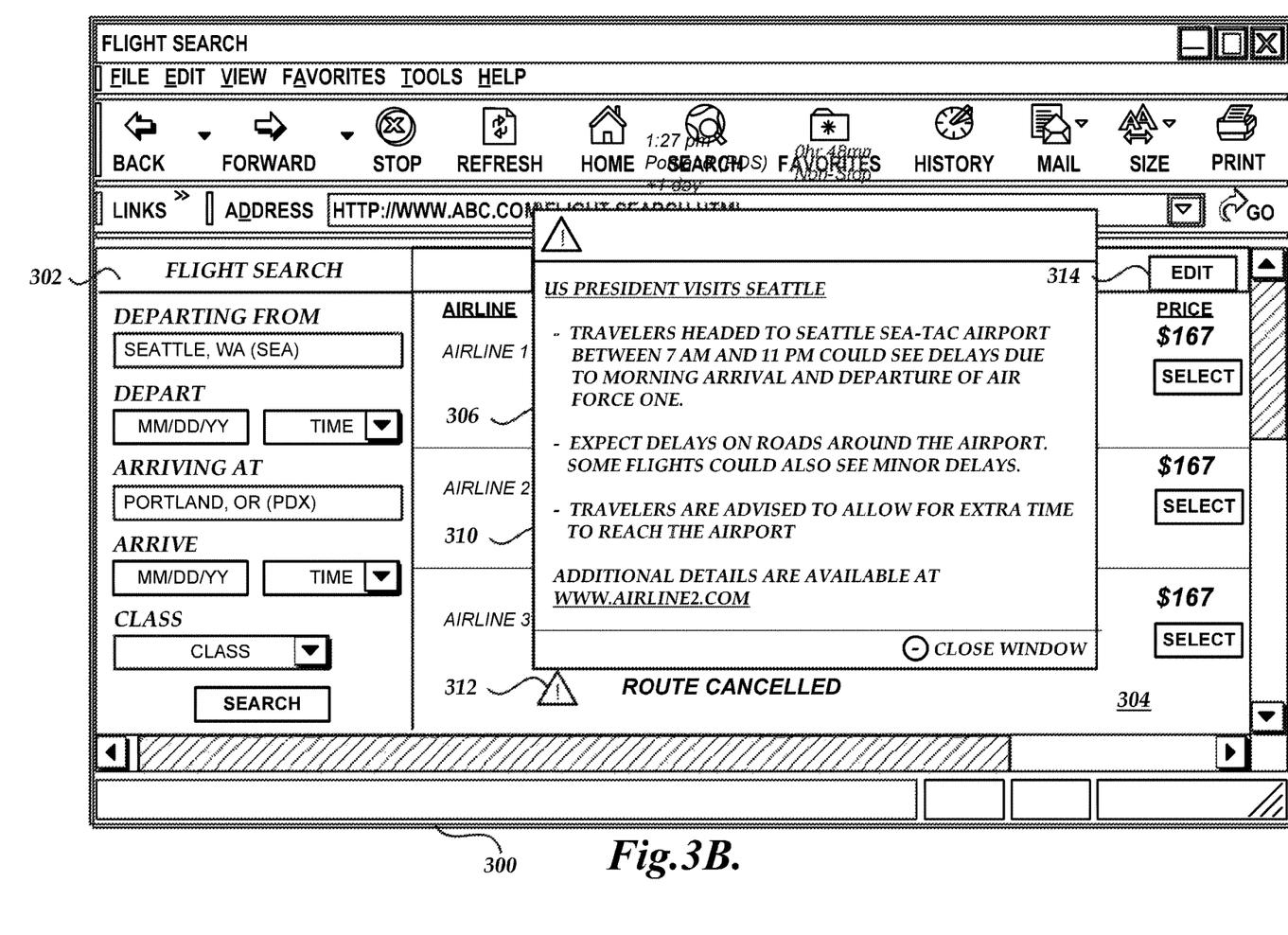

The user interface 300 may be further configured such that, when a travel advisory is selected by a user, (e.g., text or symbol), the user interface module 116 may further update the user interface 300 to display additional detailed information regarding the selected travel advisory. For example, FIG. 3B illustrates the user interface 300 of FIG. 3A in which the travel advisory 306, "US President Visits Seattle," has been selected and the travel advisory information is displayed in detail. The detailed travel advisory information may be displayed in any manner, as one skilled in the art will recognize. For example, the advisory information may be displayed concurrently with its travel item information (8). In one embodiment, the additional detailed information may be displayed in a pop-up window. In alternative embodiments, the additional detailed travel advisory information may be inserted in the search results window 304, adjacent to the corresponding travel item search result (e.g., in-line, below, adjacent, etc.).

In further embodiments, a user reviewing the user interface 300 (e.g., a system operator or travel service provider) may further request configuration of future displayed travel advisories. As illustrated in FIGS. 3A-3B a user interface object 316 (e.g., "Edit") may be selected by the user in order to request a configuration user interface from the travel advisory generation system 102 (e.g., using the user interface module 116) for this purpose. A block diagram depicting configuration of displayed travel advisories by the travel advisory generation system 102 is depicted in FIG. 4, while pictorial diagrams of illustrative user interfaces for configuring travel advisory information to be displayed concurrently with travel item search results are depicted in FIGS. 5A-5B.

Figure 4:
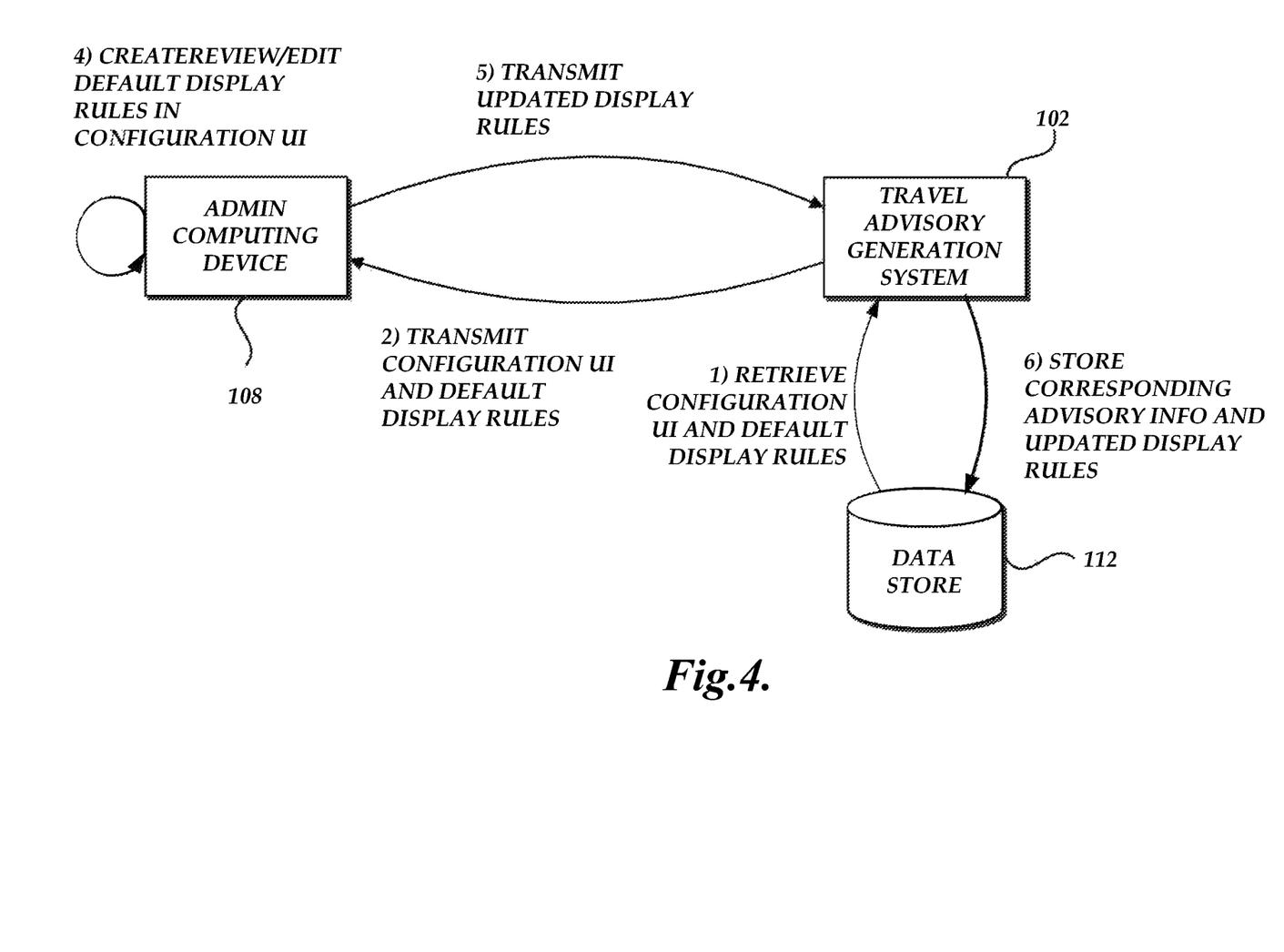
FIG. 4 is a block diagram depicting configuration of displayed travel advisories by the travel advisory generation system of FIG. 1.

With reference to FIG. 4, the user (e.g., a system operator in FIG. 4) may employ his or her administrative computing device 108 to request a configuration user interface and default display rules from the travel advisory generation system 102. For example, upon receiving a request for the configuration user interface, the user interface module 116 of the travel advisory generation system 102 may obtain stored instructions for generating the configuration user interface (e.g., a template) as well as default display rules from the data store 112 (1). Optionally, the travel advisory generation system 102 may obtain only the instructions for the configuration user interface, without default display rules. Subsequently, the travel advisory generation system 102 may transmit the instructions for displaying the configuration user interface, alone or populated with the default display rules, to the administrator computing device 108 (2).

Figure 5A:
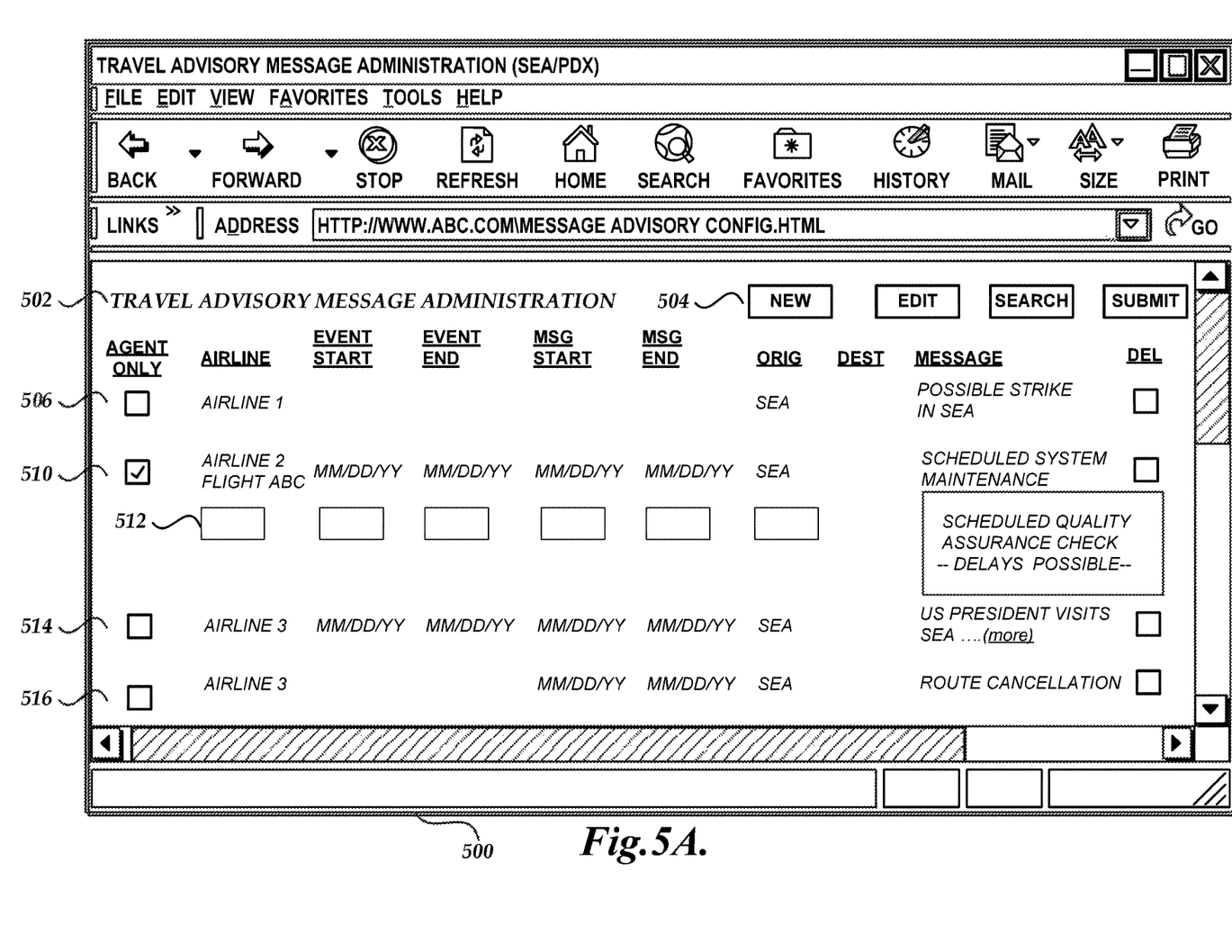
FIGS. 5A-5B are pictorial diagrams of illustrative user interfaces for configuring travel advisory information to be displayed in-line or concurrently with travel item search results.
Figure 5B:
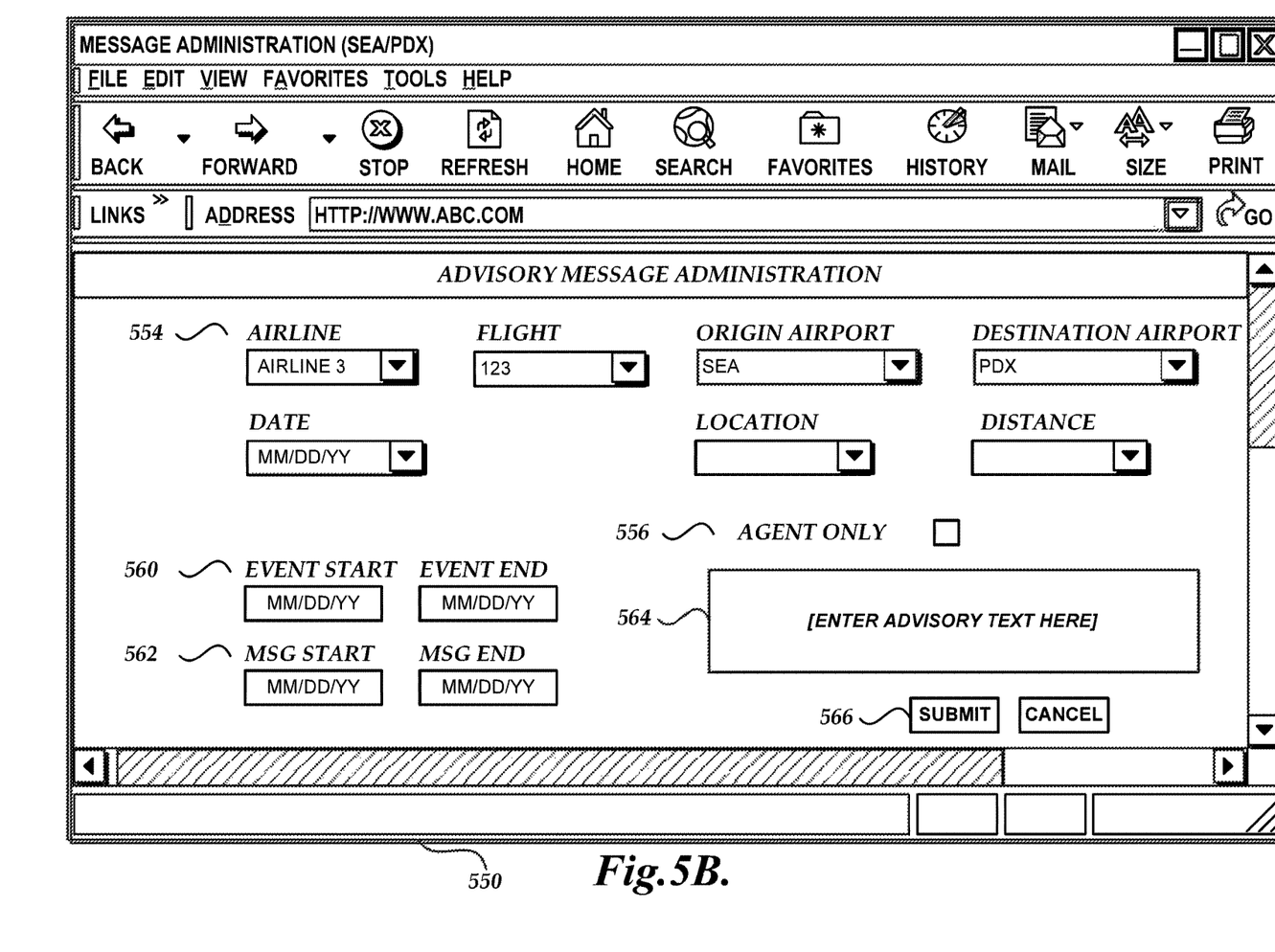

A configuration user interfaces 500 and 550 are illustrated in FIGS. 5A and 5B, respectively. In the embodiments of FIGS. 5A and 5B, it is assumed that the travel advisories pertain to airline flights. Accordingly, the user interfaces 500 and 550 allow a user to create, review, and edit travel advisories for flights. User interface 500 of FIG. 5A include a travel advisory message administration window 502 for reviewing, and editing different travel advisories and corresponding travel parameters for airline flights (4). For example, the travel advisory travel parameters may include an airline, event start/end dates, message start/end dates, origin/destination, and travel advisory message text. The airline field represents the airline affected by the travel advisory and may further include additional details, if necessary, such as specific flights, etc. The event start/end date fields indicate the start and end date (e.g., month, day, year) of an event giving rise to respective travel advisories. The message field provides summary text for each travel advisory. Additionally, the window 502 may further include a field for each travel advisory (e.g., selection box labeled "agent only") that, when selected, results in omission of the selected traveler advisory from the display for travelers and retention of the selected travel advisory for travel service providers (e.g., travel agents in the example of FIG. 5A). The user interface 500 may further include the option for the user to delete an advisory message (e.g., selection of the "del" box). Any updates to the display rules entered into the configuration user interface 500 may be transmitted (5) to the travel advisory generation system 102 (e.g., the configuration module 122) and stored in the data store 112 (6) for subsequent future retrieval.

In one embodiment, a system operator may input default display parameters which are used to generate default travel advisories displayed to travel service providers and/or travelers (e.g., prior to any additional configuration by travel service providers and/or travelers). For example, default display parameters may be entered into a previously generated travel advisory. A system operator may select a user interface object 504 (e.g., "Search") in order to search for and select previously generated travel advisories. The previously generated travel advisories may be obtained from a travel advisory network resource, or from the travel advisory generation system 102 itself, by the configuration module 122. The selected travel advisory and associated travel parameters may be provided to the user interface module 116 for population within the user interface 500 for review, edit, and/or confirmation. For example, the system operator may select a user interface object 504 (e.g., "Edit"), and edit one or more fields of the selected travel advisory, as desired. Alternatively, the system operator may review the selected travel advisory, without making changes. Whether editing or just reviewing the selected travel advisory, the system operator may confirm and store the selected travel advisory (e.g., in data store 112) by selecting user interface object 504 ("Submit").

FIG. 5A illustrates an example administration window 502 populated with travel advisories 506, 510, 514, and 516 with default display rules (e.g., default travel advisory travel parameters) for review and, optionally, edit, by the user. The default display rules for each travel advisory may be retrieved, reviewed, and stored, as discussed above, by operators of the travel advisory generation system 102 and subsequently edited by other users.

For example, advisory 506 concerns a possible strike affecting Airline 1 at the SEA airport. If the strike takes place, it will affect Airline 1 and thus Airline 1 is listed in the Airline field. However, since the exact date that the strike will start or end is not known, the event start/end date fields are left blank. Furthermore, given the ambiguity regarding the timing of the strike, appropriate start and end dates for the advisory 506 are also unknown and left blank. The message field provides the summary text for the advisory 506, "Possible Strike In SEA," previously illustrated in element 306 of the user interface 300 of FIG. 3A. Therefore, travel advisory 506 would be correlated with any flight operated by Airline 1 in or out of Seattle.

In the case of travel advisory 510, the default rules may include travel advisory summary text, "Scheduled System Maintenance" and flight ABC of Airline 2. Although maintenance is regularly performed on aircraft, unexpected problems may take more than the scheduled time to repair, causing delays in flight departure, gate traffic management, passenger throughput, etc. Thus, the start and finish date scheduled for the maintenance is populated in the event start/event end date fields. The message start and end dates specifying the date range that the advisory 510 should be displayed for corresponding travel item search results may also adopt the same date range as the start and/or finish dates, although in other embodiments, they may differ.

For example, travel advisories 510 and 516 in FIG. 5A are indicated as having the box labeled "agent" selected. One rationale for this default selection could be that, while scheduled maintenance is a commonplace occurrence, the travel advisory 510 may cause a traveler to worry that the aircraft is mechanically unsound and choose not to book this flight. Accordingly, the "agent" box may be selected by default to omit this travel advisory from display to travelers, but include this travel advisory in displays of travel agents.

Continuing this example, a travel agent may further understand that the probability of delay in departure of the flight associated with travel advisory 510 is higher than usual and make use of this information when booking travel on behalf of a client traveler. For example, when booking second flight connecting to a first flight subject to the travel advisory 510, a connecting second flight that provides a larger than usual layover time may be scheduled to account for possible delays in departure and subsequent arrival of the first flight. In another example, when a travel agent is attempting to minimize travel time for their client traveler, the travel agent could instead choose not to book the flight subject to the travel advisory for their client traveler.

In further embodiments, the user interface 500 may further permit a user (e.g., a travel service provider) to change the text of a travel advisory from default populated values. As described above for system operators, a travel service provider (e.g., a travel manager) may select the user interface object 504 (e.g., "Edit") in conjunction with any of the travel advisories displayed in window 502. For example, again assume the travel advisory of interest is travel advisory 510. In response to selection of the edit user interface object 504, the user interface module 116 may update the user interface 500 with fields (e.g., fields 512) that may be used to edit any of the default rules (e.g., airline information, dates, message, origin, destination, etc.) of the travel advisory 510.

The ability to configure the advisories may be employed by travel managers of an organization to edit default travel advisories displayed with travel item search results provided by the travel advisory generation system 102 to travelers of the organization that reflect travel policies of their organization. For example, continuing the example of travel advisory 510 discussed above, rather than omit display of travel advisory 510 to travelers of an organization, a decision may be made by the travel manager to edit the text of the travel advisory message 510 from "Scheduled System Maintenance," to, "Scheduled Quality Assurance Check—Delays Possible" in edit field 512. Thus, travelers of the organization may receive useful travel advisory information that there is the possibility of a delay on this flight, without potential misunderstandings regarding the seriousness of the delay.

In a further embodiment, the system operator may generate a new travel advisory by selecting the user interface object 504 (e.g., "New"). In response to this selection, the user interface module 116 may provide another configuration user interface 550 (FIG. 5B). In user interface 550, the system operator may enter one or more of the travel parameters 554 (e.g., airline, flight, origin, destination, location and distance) associated with the advisory. The system operator may further enter start and/or end dates 560 for a travel advisory event, start and/or end dates 562 for the travel advisory message to be associated with the travel parameters and potentially displayed with travel item search results, and the text of the travel advisory message 564. The system operator may, optionally, also select the agent only box 556 so that the travel advisory is displayed only to travel agents, by default. Once the system operator is satisfied with the entries in user interface 550, the system operator may select the user interface object 566 (e.g., "Submit") to submit the entered travel advisory for storage in and subsequent retrieval from the data store 112. Alternatively, the system operator may exit the user interface 550 without saving and return to the user interface 500 by selecting the user interface object 566 (e.g., "Cancel").

In additional embodiments, the travel advisory generation system 102 may be further employed to make global advisory changes. For example, a set of emergency display rules may be employed to update display of travel advisories in response to emergency events. For example, a user (e.g., a system operator) may employ a configuration user interface (e.g., 500) to select emergency display rules for a particular type of emergency (e.g., utility outage, natural disaster, etc.). The emergency display rules may globally overwrite pre-existing default display rules that would be normally used by the travel advisory generation system 102. For example, in the case of a power outage at a specific airport, travel advisories may be generated indicating that all inbound flights to and/or outbound flights from that airport are delayed or cancelled. In certain embodiments, the travel advisory generation system 102 may prompt the user for confirmation prior to implementation of emergency display rules.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for enhancing search results for a travel item of interest, the system comprising:
    a data storage device configured to maintain one or more travel advisories, wherein each of the one or more travel advisories is associated with a respective travel item parameter;
    a travel advisory computing device in communication with the data storage device, the travel advisory computing device configured to:
        in response to a travel item search query from a user, obtain information regarding one or more travel items available for acquisition;
        extract a first travel item parameter from a first unacquired travel item of the one or more travel items available for acquisition;
        compare the first travel item parameter with a travel item parameter associated with a first travel advisory of the one or more travel advisories to determine that the first travel advisory corresponds to the first unacquired travel item;
        extract a second travel item parameter from a second unacquired travel item of the one or more travel items available for acquisition, wherein the second unacquired travel item and the first unacquired travel item are the same type of travel item;
        compare the second travel item parameter with the travel item parameter associated with the first travel advisory to determine that the first travel advisory does not correspond to the second unacquired travel item; and
        generate instructions to display a first user interface that indicates that the first travel advisory pertains to the first unacquired travel item and does not pertain to the second unacquired travel item, and presents the first travel advisory concurrently with information enabling the user to select and subsequently acquire the first unacquired travel item;
    wherein the travel advisory computing device is further configured to:
        transmit the instructions to display the first user interface to a computing device of the user; and
        generate instructions to display, on a second user computing device, a second user interface that presents information enabling a second user to select and subsequently acquire the first unacquired travel item without concurrently presenting the first travel advisory.

2. A non-transitory computer readable medium having a computer-executable component for identifying notifications for travel items of interest, the computer-executable component comprising:
    a travel advisory component configured to:
        obtain from a user a search query including a travel parameter related to a travel item of interest;
        identify, in response to the search query, information regarding a plurality of travel items available for acquisition and corresponding to the travel parameter, the plurality of travel items including at least a first unacquired travel item and a second unacquired travel item, the first unacquired travel item and the second unacquired travel item being the same type of travel item;
        extract a travel parameter from the first unacquired travel item;
        identify, based at least in part on the travel parameter, at least one travel advisory corresponding to the first unacquired travel item;
        determine, based at least in part on the travel parameter, that the at least one travel advisory does not correspond to the second unacquired travel item; and
        generate instructions to display a first user interface that indicates that the at least one travel advisory corresponds to the first unacquired travel item and does not correspond to the second unacquired travel item, and that presents the at least one travel advisory concurrently with information enabling the user to select and subsequently acquire the first unacquired travel item;
    wherein the travel advisory component is further configured to:
        display the first user interface at a computing device of the user; and
        display a second user interface at a computing device of a second user, wherein the second user interface enables the second user to select and subsequently acquire the first unacquired travel item and omits the at least one travel advisory associated with the first unacquired travel item.

* * * * *